United States Patent

[11] 3,565,014

[72] Inventor Fausto Celorio Mendoza
Cumbres de Acultzingo No. 185, Lomas De Chapultepec, Mexico City, 10, Mexico
[21] Appl. No. 764,745
[22] Filed Oct. 3, 1968
[45] Patented Feb. 23, 1971

[54] AUTOMATIC TORTILLA-MAKING MACHINES
9 Claims, 8 Drawing Figs.
[52] U.S. Cl. .................................................. 107/15
[51] Int. Cl. .................................................. A21c 3/00
[50] Field of Search .......................................... 107/15.1,
15.5, 15.7, 15.9, 8.35, 68, 14; 18/2 (RA), 21

[56] References Cited
UNITED STATES PATENTS
1,857,927  5/1932  Mason ......................... 107/15.5

3,326,144  6/1967  Palmer ......................... 107/14

Primary Examiner—Henry S. Jaudon
Attorney—Jeffers & Rickert

ABSTRACT: The invention concerns an automatic tortilla-making machine which has a hopper with two rolls therebeneath that turn in opposed directions. One of the rolls is provided with diametrically opposed pistons operating within cylinders formed in the roll to receive dough from the hopper. The piston head is formed with an outer surface corresponding to the curvature of the roll so that when the dough is received in the cylinder, the piston head can push the formed dough to the surface of the roll where it is removed from the roll by a knifelike device and drops to a conveyor. A flour spraying device is provided for each of the rolls to prevent sticking of the dough to the rollers.

INVENTOR.
FAUSTO CELORIO MENDOZA

AUTOMATIC TORTILLA-MAKING MACHINES

The present invention refers to improved automatic tortilla-making machines, and refers more particularly to a novel tortilla shaping head, suitable for ejecting automatically the tortillas already made, before submitting them to the baking process. A tortilla, as is known, is a typical Mexican Indian corn pancake.

It will be understood that the improved automatic machine according to the present invention, may be employed in the making of tortillas made from Indian corn, wheat, rye, and similar products.

Automatic tortilla-making machines are known wherein the dough is formed to a strip in passing between a pair of rolls. This strip is cut by means of circular dies to the shape desired for the tortilla, usually dislike. Other devices can thereby be employed for further shaping of the tortilla.

It is obvious, in such a method, that the dough which does not constitute the tortilla, that is, the waste material of the dough remaining from the cutting of the tortillas, will constitute a problem for the manufacturer because such material must be worked back into the dough being processed, if possible.

Certain kinds of dough, however, cannot be kneaded again, since this operation would adversely affect the taste and texture of the product. The leftover dough in this case represents a substantial loss.

It is therefore an object and primary purpose of the present invention, to provide an automatic tortilla making machine, wherein there is no waste of dough.

Another object of the present invention is to provide an automatic tortilla making machine, wherein the machine operates to shape and eject the tortilla before baking thereof, and in a novel and efficient manner without waste of dough.

An object of the present invention is the provision of a machine which is economical to operate due to the fact that no dough is wasted.

These and other objects and advantages of the present invention will become more apparent from the following description taken with connection with the accompanying drawings, in which.

Figure 1:
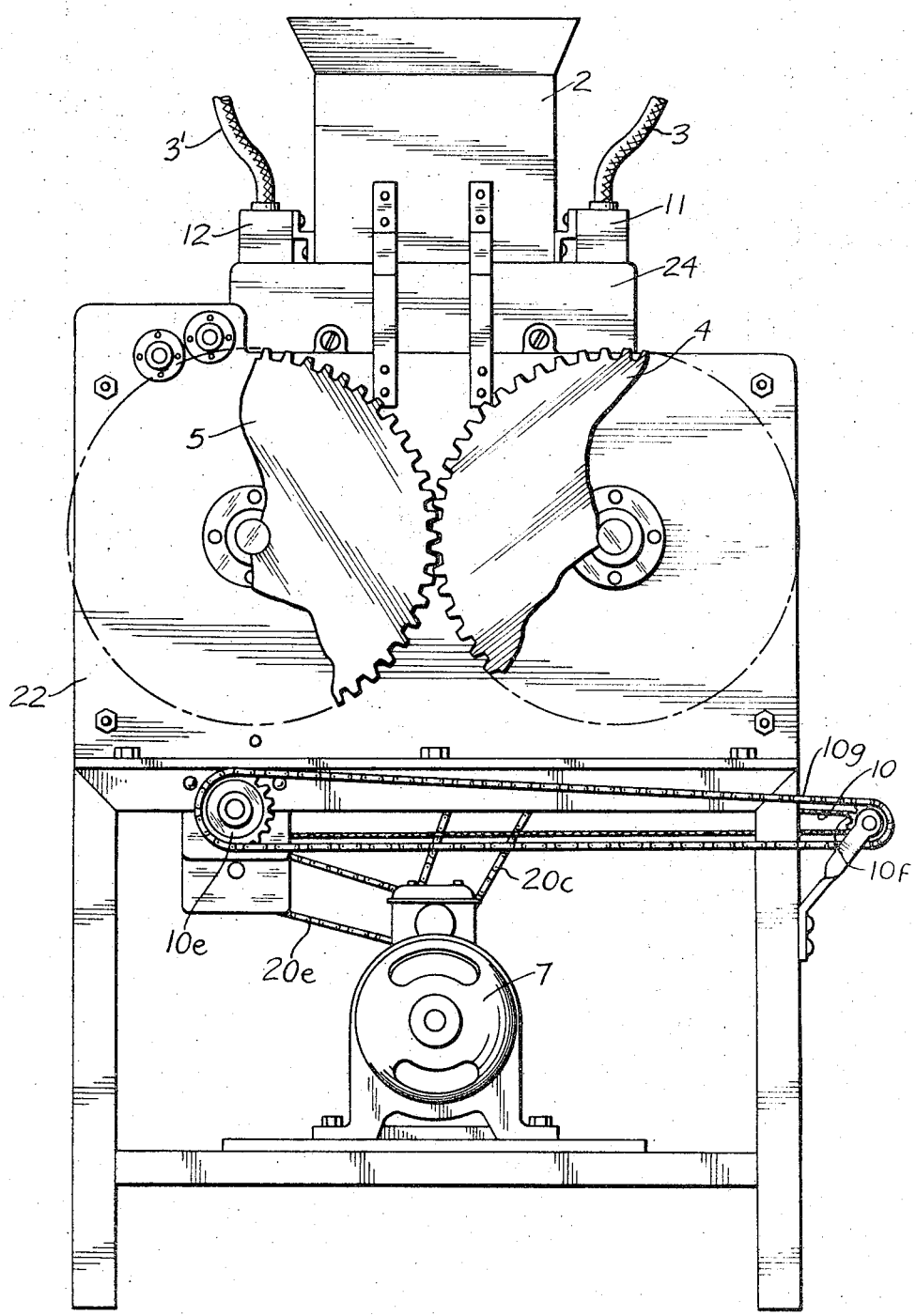
FIG. 1 is a side view of a tortilla making machine according to the present invention.
Figure 3:
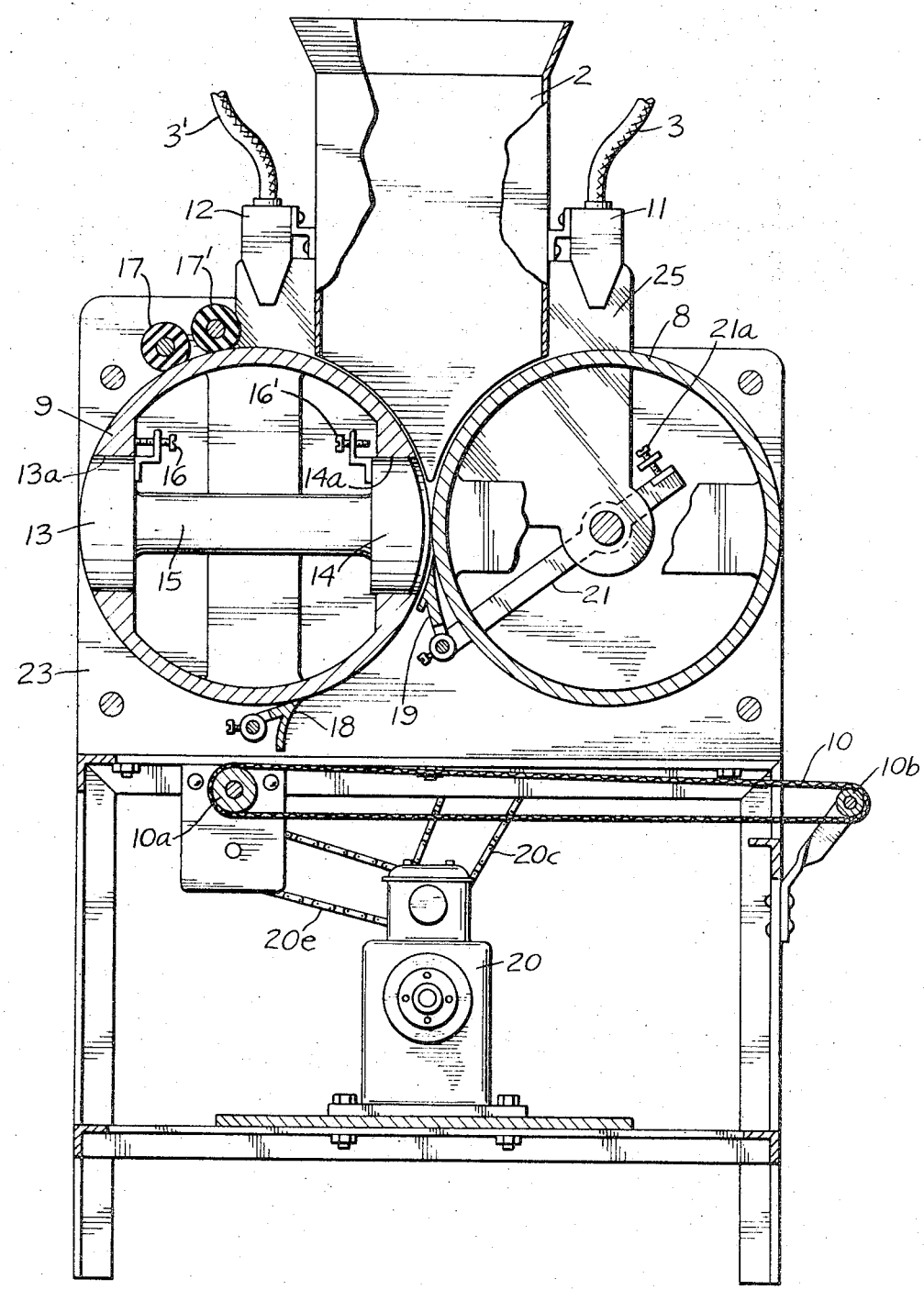
Figure 4:
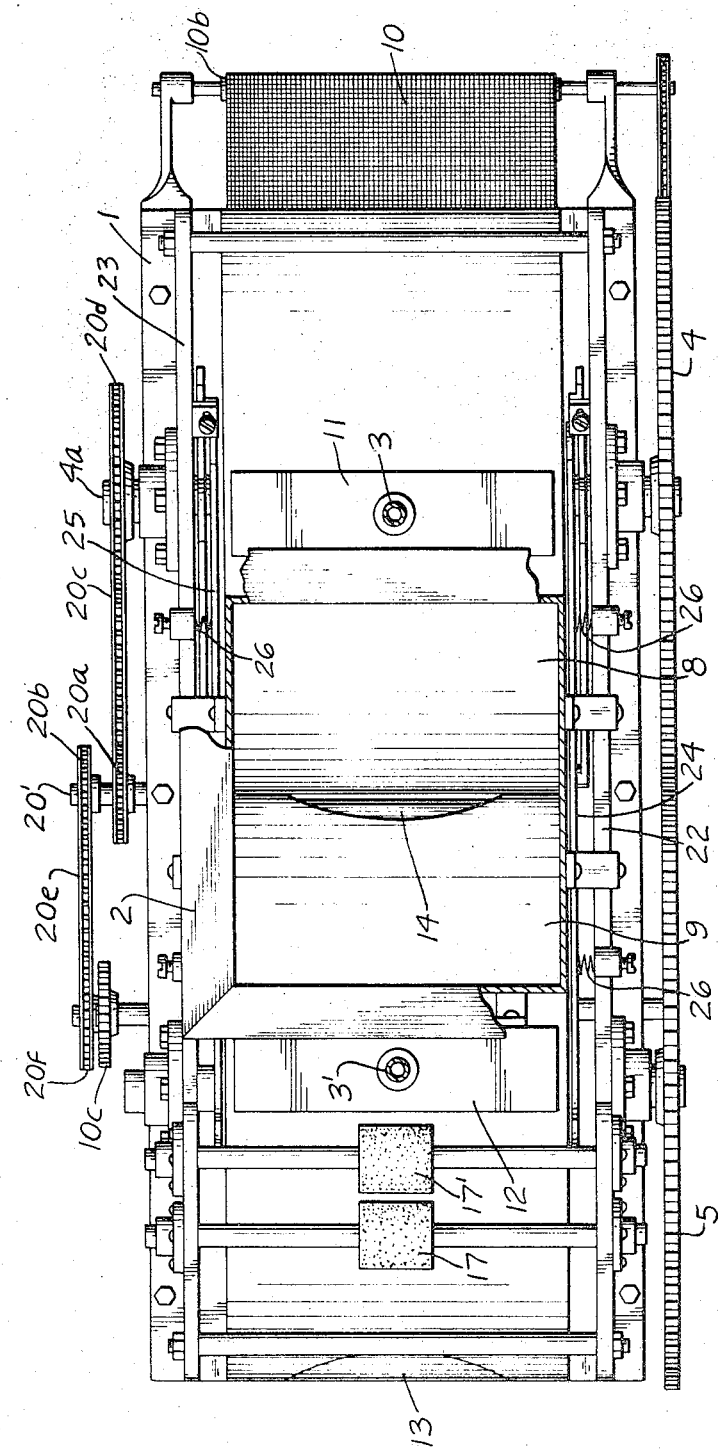
Figure 5:
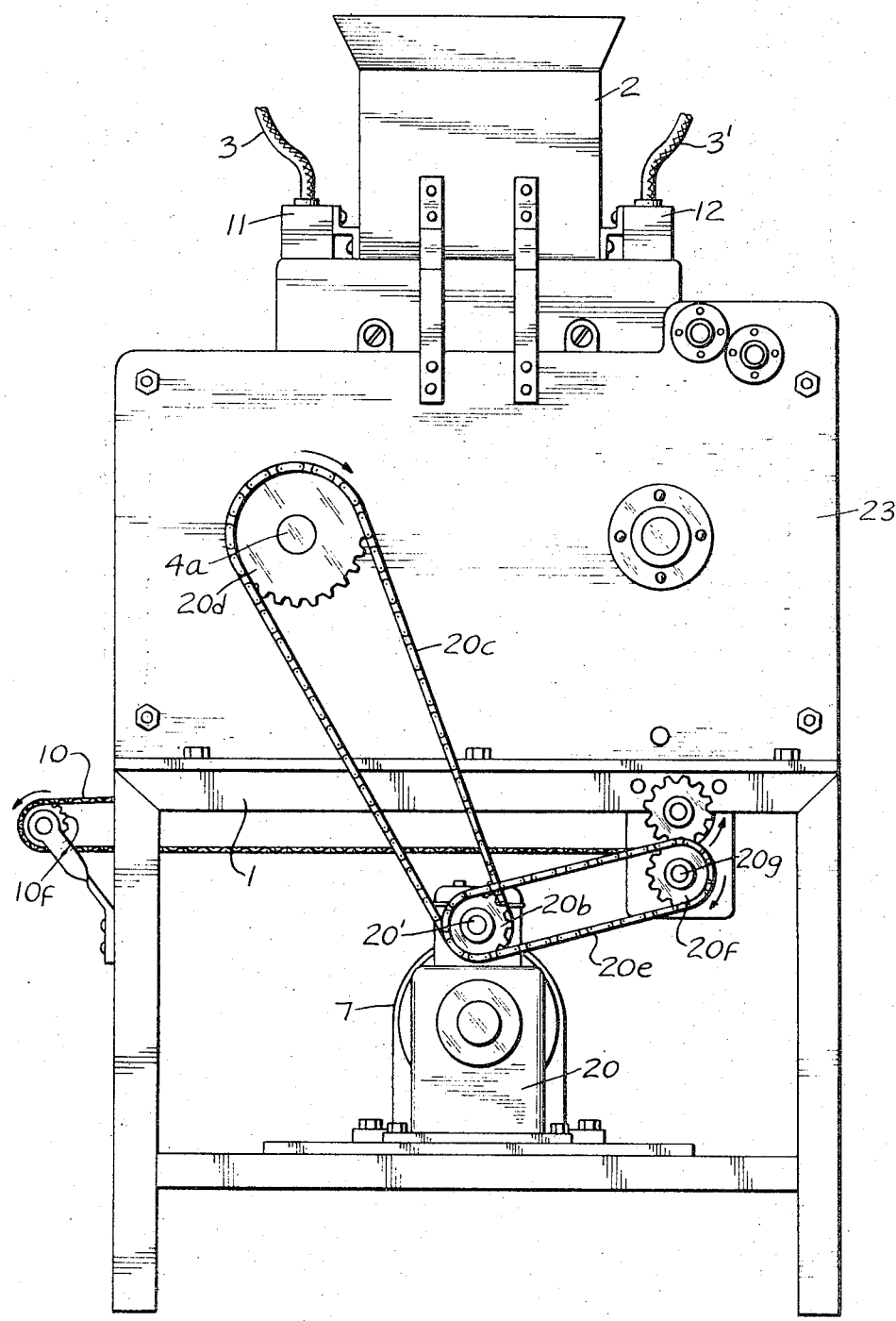
Figure 6:
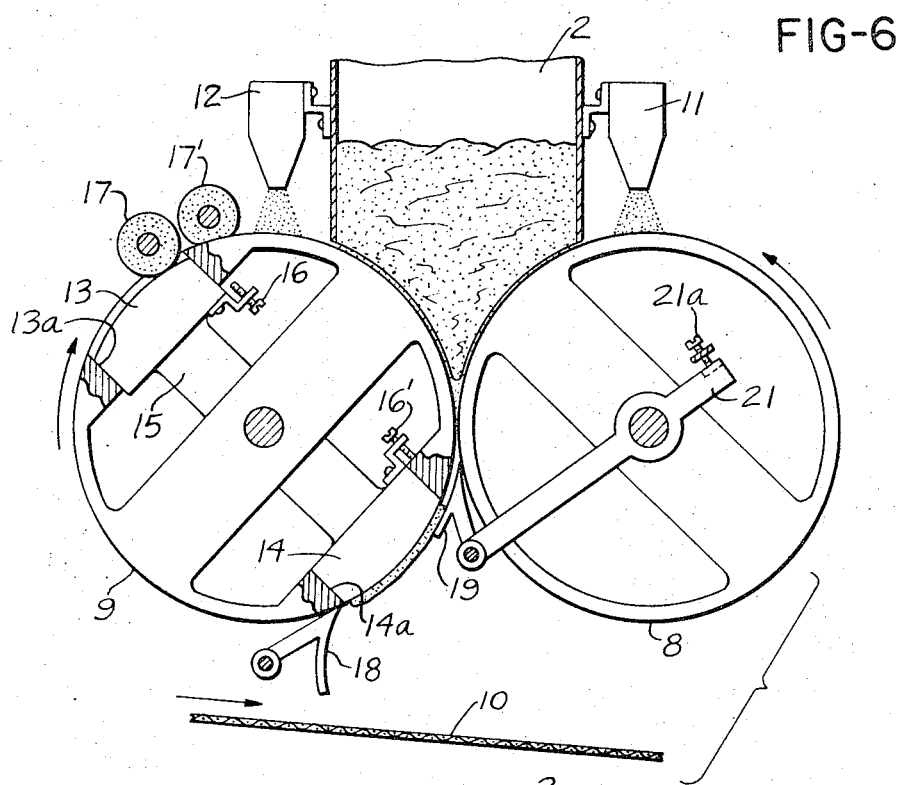
Figure 7:
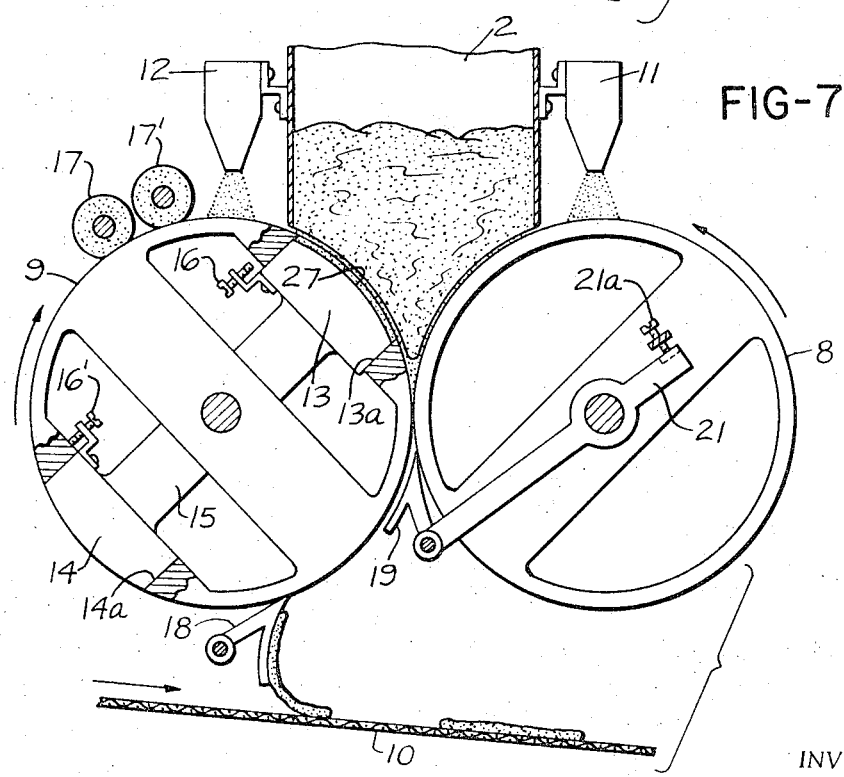

FIG. 3 constitutes a lateral or side view of the machine, with some parts in section so as more clearly to illustrate the inner parts of the machine;

FIG. 4 is a top plan view of the machine;

FIG. 5 is a view of side of the machine opposite to the side shown in FIG. 1;

FIGS. 6 and 7 are views showing the operation of the machine; and

Figure 8:
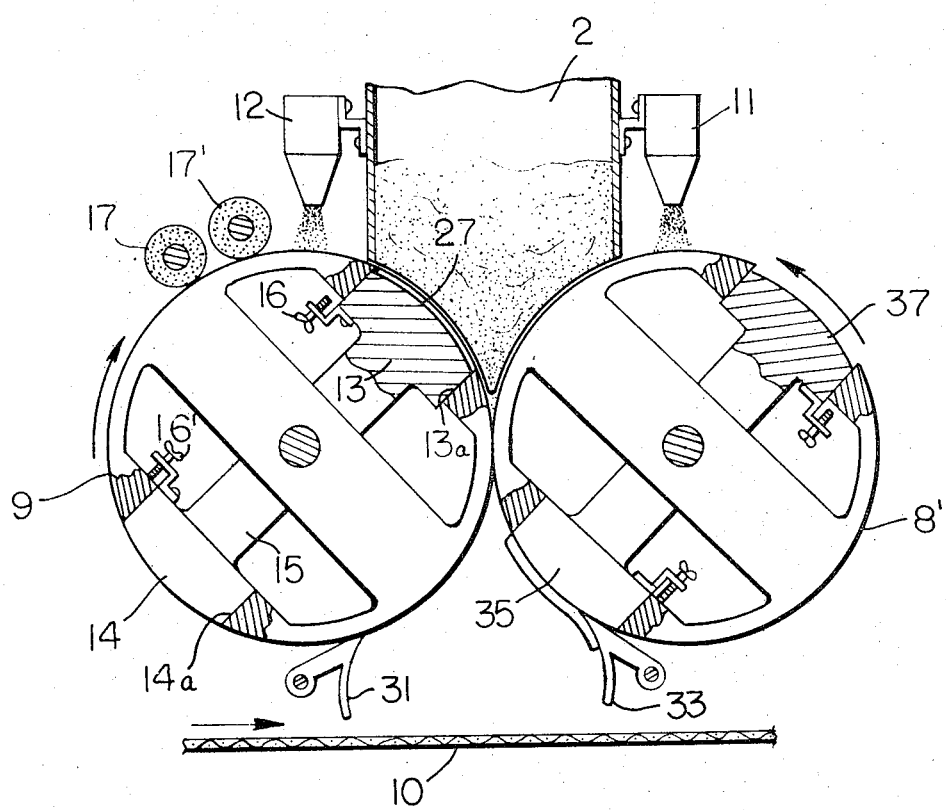

FIG. 8 is a view showing a modified operation of the machine similar to FIGS. 6 and 7.

Referring to the drawings more in detail, and more particularly to FIG. 1, an automatic tortilla making machine according to the present invention has a central hopper 2. Below hopper 2 are two rolls 8, 9, rotatable on horizontal, parallel and laterally spaced axes. Gears 4, 5, on the rolls are in mesh and cause the rolls to rotate in unison but in respectively opposite directions.

Below the rolls 8 and 9, there is an endless conveyor belt 10, of the conventional type, which is designated to transport the duly shaped product to a suitable baking or boiling device, which may also be a baking/conveying device.

Both the motion of the rolls 8 and 9 and the motion of the endless belt 10, is provided by power supplied by a drive motor 7.

Motor 7 drives the input shaft of a speed reducer 20 which has an output shaft 20′ (FIG. 5), a pair of sprockets 20a and 20b (FIG. 2) are mounted on shaft 20′. A chain 20c entrained over sprocket 20a is also entrained over a sprocket 20d (FIG. 5) on the shaft 4a on which roll 4 is mounted.

Figure 2:
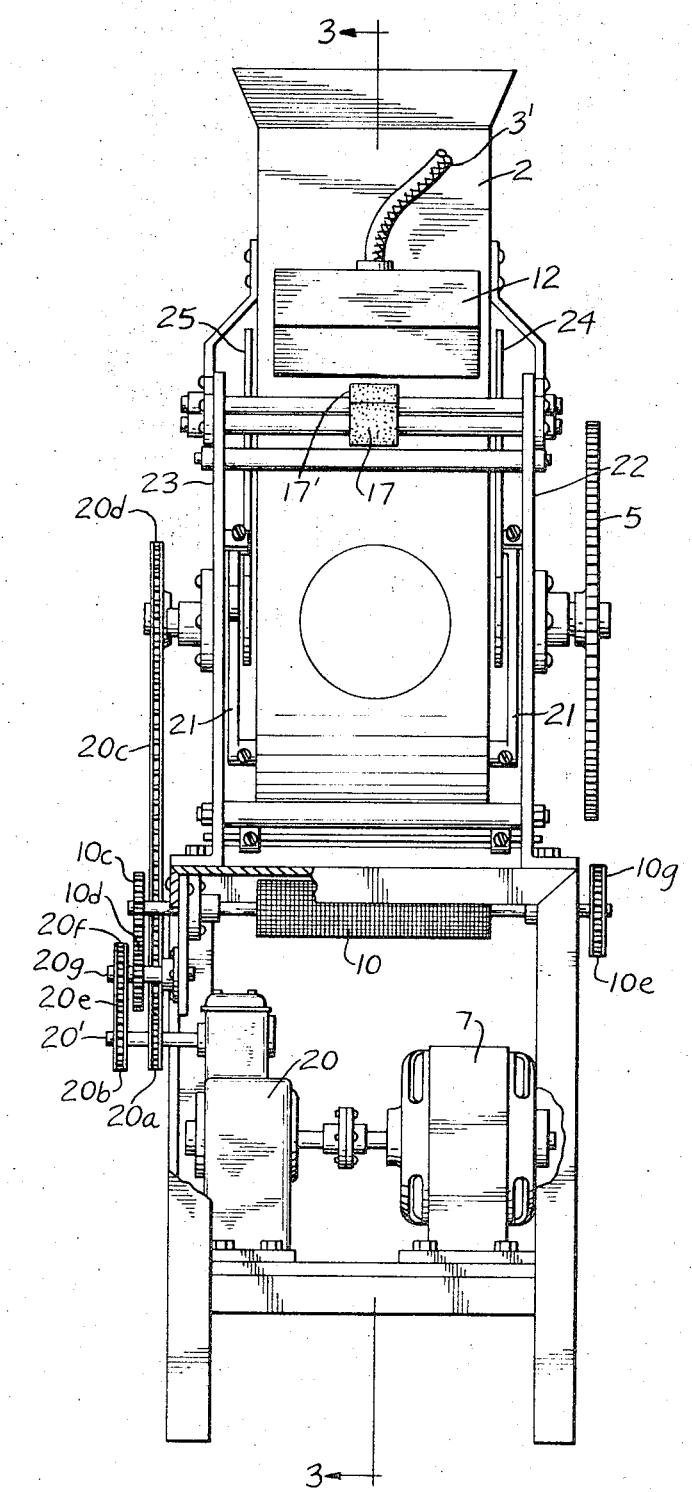
FIG. 2 is a front view of the machine.

A chain 20e is entrained over sprocket 20b and is also entrained over a sprocket 20f (FIG. 5) which is mounted on an idler shaft 20g (FIG. 2). Belt 10 passes over rollers 10a an 10b and on the shaft of roller 10a and on shaft 20g are the meshing gears 10c and 10d. Further, sprockets 10e and 10f on the shafts of rollers 10a and 10b are engaged by a chain 10g so that both of rollers 10a and 10b are driven to move belt 10.

Referring now to FIG. 3, it will be seen that the tortilla making machine in accordance with the present invention, is characterized in that roll 9 is provided with two pistons 13 and 14, diametrically opposed with relation to the roll 9, and which are joined by means of a bar 15. Cylinders 13a and 14a are provided for the pistons and the pistons and the pistons are adapted to move axially, in their respective cylinder with the motion thereof limited by means of the regulating screws 16, 16′ carried on the inner ends of the pistons and each engageable with the inside wall of roll 9 when the respective piston has its outer end flush with the surface of roll 9.

It will be noted that when one of the pistons is flush with, or nearly flush with, the surface of roll 9, the other piston is in its lowered or depressed position, thus forming a cavity with a circular contour, the bottom of which is formed by the outer surface of the respective piston. Pistons 13 and 14 move axially by gravity, or, by gravity in combination with the pressure exerted by the pair of resilient rollers 17, 17′, which are in pressure engagement with the periphery of roll 9 at a predetermined region.

Additionally, the automatic tortilla making machine is provided with a pair of knives 18, 19, (FIG. 3) which are positioned adjacent the surface of respective ones of the rolls 9 and 8. Knife 19 is carried by a pair of arms 21 which are pivotal on the shaft of roll 8, the said knife 19 being positioned at a point adjacent the surface of the said roll 8, preferably, just below the region where rolls 8 and 9 are closest to each other. Knife 19 is held in position to strip the dough from roll 8 by the stop screws 21a stationarily carried by the machine frame.

Roll 9 is provided with a knife 18, which is adjacent the surface of the roll 9 at the point where the pistons have moved outwardly. Both knife structures include means for regulating the distances between the edges of the knives and the roll surfaces.

Located above each of the rolls, and laterally with relation to the hopper, there are two spraying devices for flour, which direct a spray of flour to the respective roll. That is, spraying device 11 will direct a fine flour spray to the surface of roll 8 and spraying device 12 will direct a fine flour spray to the surface of roll 9 while conduits 3, 3′ supply flour to the devices.

Below the roll 9, and more particularly below knife 18, there is present the endless belt 10, which in accordance with the above mentioned, will receive the shaped product stripped form roll 9, in order to transport it to a second phase of the processing, which phase could well be the baking stage.

According to the present invention, the shape of the tortilla is obtained without producing any waste material and, to accomplish this, in addition to the above mentioned rolls and the distribution or location thereof, some lateral elements are required in order to confine the dough exclusively to the surfaces of the rolls, with the purpose of preventing lateral leakages.

In order to attain this object there are located two rigid rails 22 and 23 which are fixedly attached to frame 1 of the machine. Furthermore, there is a pair of lateral plates 24 and 25, made of bronze, brass, or copper, and disposed so near to the ends of the rolls 8 and 9 that they prevent the escape or leakage of the dough laterally from between the rolls. At the same time, the plates 24, 25 are so supported as to prevent friction caused by the rotation of the rolls from damaging either the plates or the rolls. The plates 24 and 25, with relation to the extreme ends of the rolls, are urged toward the ends of rolls 8, 9 by springs 26 bearing between plates 24, 25 and rails 22, 23.

When the automatic tortilla making machine of the present invention is in operation, the dough contained in the hopper 2 will descend by gravity and through the action of the rotation of the rolls 8 and 9, will fill the perforation or cavity 27. In this manner, only the dough necessary for the production of one tortilla will descend and enter the said cavity. The roll 8 will press the dough into the cavity, causing it to conform to the shape of this cavity, and will prevent the passage of excess dough. Once the roll 8 has pressed the dough into the cavity, the said dough will be confined to its recess and will not adhere to the surface of the roll 8, due to the fact that the said roll previously received a very fine flour spraying, which was supplied thereto by spray device 11. Furthermore, knife 19 adjacent roll 9 will prevent the dough of the tortilla from adhering to the surface of the said roll 8.

The dough, as has been mentioned, will travel within its recess for a certain distance, until the piston 14, due to the gravitational force acting thereon starts its lowering travel. In case there might exist unforeseen forces that hinder the motion of the piston structure by gravity, the rollers 17 and 17' made of resilient material, will act on the piston 13, and force the piston structure into position to lower piston 14.

The motion of the piston 14 will bring its surface into a flush condition with relation to the surface of roll 9, thus disposing the shaped dough from the cavity in a projecting position with regard to the said surface of roll 9. In this position, the dough will be stripped from roll 9 by knife 18 (FIGS. 6 and 7), and will drop to the endless belt 10.

It must also be mentioned that the loosening, or taking off, of the dough in tortilla shape is made easier due to the fact that the surface of the roll 9 has also received a fine spraying of flour as supplied by the spraying device 12.

It will be apparent that while only two cavities have been shown in only one of the rolls, there could be more than two cavities in a roll and, furthermore, cavities could be provided in both of the rolls as illustrated in FIG. 8. In the case where cavities are provided in both rolls, the cavities would be so distributed about the rolls that each cavity would face a position of the other roll having no cavity therein. Further, the case of cavities in both of the rolls, each roll would have a loosening knife 31, 33 toward the bottom.

The embodiment illustrated in FIG. 8 differs only slightly from the embodiment illustrated in FIG. 7 and like reference numerals indicate identical parts. Thus the roller 9 and all of its associated parts are identical, the flour spraying devices 11 and 12 as well as the central hopper 2 and endless belt 10 remain unchanged. The roll 8' has been modified to contain a second pair of cavities and a second pair of pistons 35 and 37 the axis of which is 90° removed from the axis of the pistons 13 and 14 in the roller 9. In the embodiment of FIG. 8 there is no roller associated with the roll 8' similar to the rollers 17 or 17' associated with the roll 9. These rollers have not been illustrated for the roll 8' to emphasize the fact that the motion of the pistons 35 and 37 may be solely created by the gravitational forces exerted thereon.

The drawings show only diametrically opposed cavities but it will be appreciated that the cavities could otherwise be arranged, the important thing being that each cavity has a piston which, in its inner position defines the bottom of the cavity and in its outer position ejects the article from the cavity together with means for moving the piston bottom between its two said positions.

Although there has been described and illustrated a particularly preferred embodiment of the present invention, it is obvious that changes and modifications can be made therein and that the scope of the said invention is defined in the terms of the following claims.

I claim:

1. In an automatic dough processing machine for making formed articles of dough, especially tortillas: a frame, a pair of rolls in said frame having their axes in parallel spaced relation in a horizontal plane and rotatable in a direction to cause their sides facing each other to move downwardly, a hopper in said frame above said rolls for feeding dough downwardly to the space between the rolls, radial cylinder means in at least one of said rolls, piston means axially moveable in said cylinder means between an outer position wherein the outer end of the piston means is substantially flush with the surface of said one roll and an inner position wherein the outer end of said piston means is spaced inwardly from the surface of said one roll a distance about equal to the thickness of the article to be formed in the machine, said rolls substantially touching where nearest each other so the dough between the rolls will be pressed into and confined to said cylinder means, a knife in said frame adjacent the surface of said one roll and located at a point about the periphery of said one roll which is spaced from the region where the surfaces of said rolls commence to separate a distance such that the action of gravity on the said piston means in a said cylinder means which is approaching said knife will urge the piston means toward its outer position and in which position of the piston means said knife can dislodge the formed dough article from the roll, and a conveyor in said frame at a level lower than that of said rolls to receive the dough articles dislodged by said knife.

2. A dough processing machine according to claim 1, which includes biasing means operable for biasing said piston means in the radially outward direction of said one roll as the piston means approach said second knife.

3. A dough processing machine according to claim 2 in which said piston means are in the form of at least one pair of diametrically opposite pistons fixedly interconnected to move in unison and each occupying its said inner position when the other occupies its said outer position.

4. A dough processing machine according to claim 3 in which said biasing means comprises resilient roller means arranged in said frame in pressure engagement with the surface of said one roll at a region diametrically opposite the region of said one roll which is just ahead of said second knife.

5. A dough processing machine according to claim 4, which includes flour spraying devices in said frame located at the tops of said rolls to supply flour thereto prior to the surfaces of said rolls approaching each other.

6. A dough processing machine according to claim 1 which includes means for adjusting said knife radially relative to said roll.

7. A dough processing machine according to claim 1, which includes plates at the ends of said rolls preventing escape of dough laterally from said rolls.

8. A dough processing machine according to claim 7, which includes spring means biasing said plates toward the adjacent ends of said rolls.

9. A dough processing machine according to claim 1 in which both of said rolls have the said cylinder means and piston means therein, said rolls being of the same size and geared together to rotate in unison, and the cylinder means and piston means of the respective rolls presenting themselves alternately to the space between the rolls where the dough is pressed into said cylinder means, each said roll also having a said knife for dislodging the formed dough articles therefrom so the articles will drop to said conveyor.